United States Patent [19]

Kono

[11] Patent Number: 5,072,255
[45] Date of Patent: Dec. 10, 1991

[54] OPTICALLY VARIABLE MAGNIFICATION MECHANISM

[75] Inventor: Akira Kono, Yamato-Koriyama, Japan

[73] Assignee: Sharp Kabushiki Kaisha, Osaka, Japan

[21] Appl. No.: 624,737

[22] Filed: Dec. 7, 1990

[30] Foreign Application Priority Data

Dec. 18, 1989 [JP] Japan .................................. 1-328694

[51] Int. Cl.⁵ ...................... G03B 27/36; G03G 15/04
[52] U.S. Cl. ...................................... 355/58; 355/235; 355/243
[58] Field of Search ...................... 355/243, 58, 55, 235, 355/210

[56] References Cited

U.S. PATENT DOCUMENTS

| | | | |
|---|---|---|---|
| 4,007,986 | 2/1977 | Komori et al. | 355/58 |
| 4,487,497 | 12/1984 | Kimura et al. | 355/58 X |
| 4,571,064 | 2/1986 | Hayashi et al. | 355/58 X |
| 4,582,418 | 4/1986 | Kozuka et al. | 355/58 X |
| 4,800,414 | 1/1989 | Takeda | 355/58 |
| 4,854,672 | 8/1989 | Daikoku | 355/58 X |
| 4,956,672 | 10/1990 | Shibazaki et al. | 355/243 |

*Primary Examiner*—A. T. Grimley
*Assistant Examiner*—Nestor R. Ramirez
*Attorney, Agent, or Firm*—David G. Conlin; Robert M. Asher

[57] ABSTRACT

An optically variable magnification mechanism that comprises a motor which rotates in one direction. A rotary cam is arranged so as to be rotated in one direction by the motor and has cam surfaces assigned on a periphery thereof corresponding to a plurality of magnification steps. A cam drive unit is arranged for transmitting a rotary force from the motor to the cam. An optical system is movable between positions corresponding to the magnification steps. A transmission system is arranged for transmitting a rotary force of the cam to the optical system to change the positions of the optical system sequentially.

4 Claims, 5 Drawing Sheets

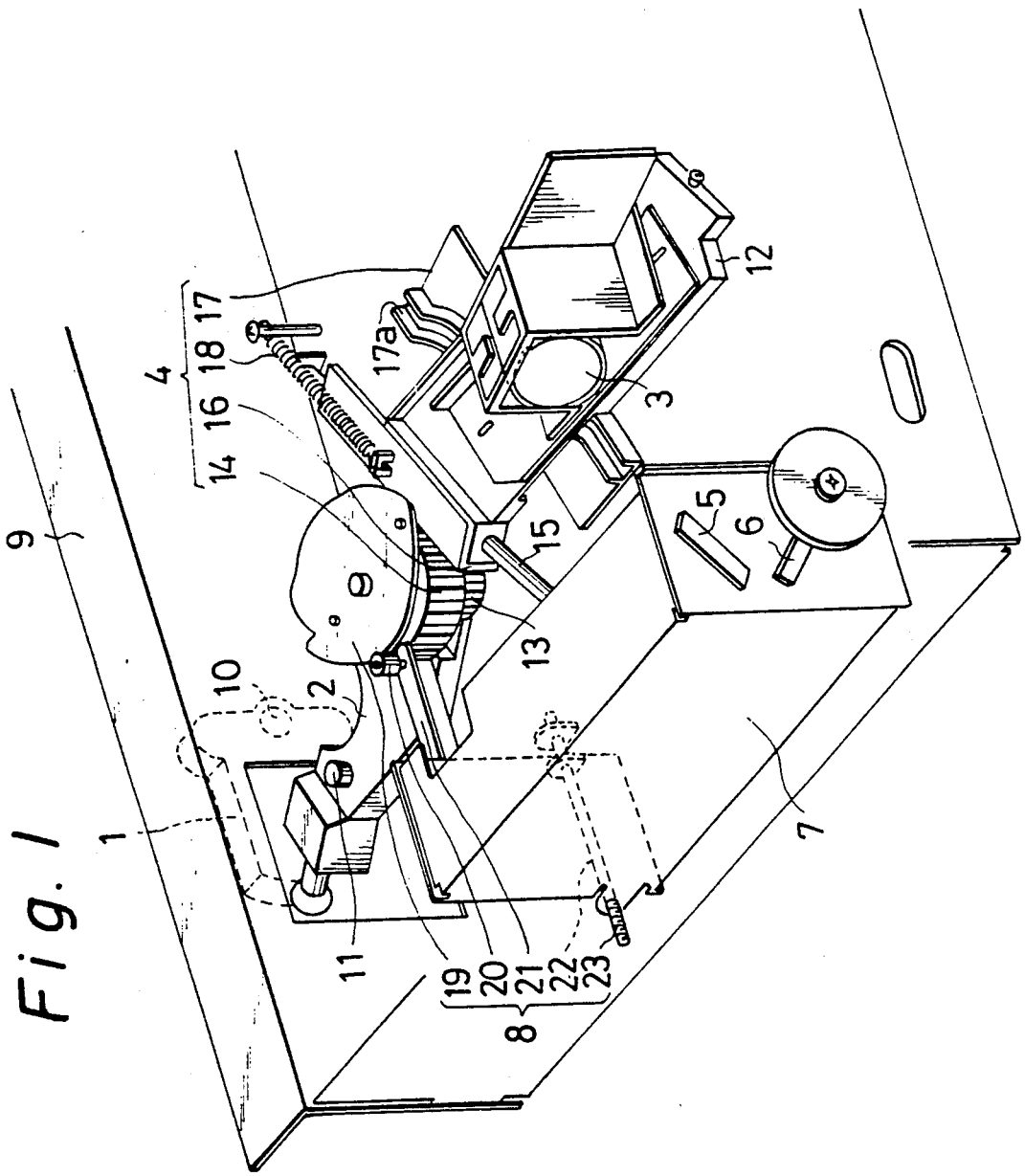

OPTICALLY VARIABLE MAGNIFICATION MECHANISM

BACKGROUND OF THE INVENTION

1. Field of the Invention

The present invention relates to an electrophotographic copying apparatus equipped with a fixed type variable magnification system having fixed magnification scales to steppingly vary the magnification of the copy, more particularly the invention relates to a variable magnification mechanism for the optical system of the copying apparatus.

2. Description of the Related Art

The variable magnification mechanism of the copying apparatus changes the magnification of the copy from reduction to enlargement. The magnification mechanism comprises an optical system including mirrors and lenses which have to be shifted in the opposite directions for the reduction scale and the enlargement scale with respect to the position of the full size magnification.

On the other hand, the copying apparatus comprises a conveyor system for conveying the photoconductor drum and the copying papers. The conveyor system comprises a main drive motor which is able to rotate only in one direction. Therefore, it is necessary to prepare a reversible motor installed within the apparatus specially for changing the magnification in addition to the main motor so that the mirrors and lenses of the optical system are shifted to a predetermined position of the desired magnification.

However, the arrangement of such a reversible motor for changing the magnification in addition to the main motor makes the structure of the apparatus complicated and the production cost thereof high.

SUMMARY OF THE INVENTION

The present invention was made considering the above mentioned points.

It is therefore an object of the present invention to provide an optically variable magnification mechanism which makes it possible to drive the optical system for changing the magnification with the use of the main motor without preparing a special reversible motor, thereby simplifying the structure and reducing the cost.

The above mentioned object of the present invention can be achieved by an optically variable magnification mechanism comprising:

a motor which rotates in one direction;

a rotary cam which is rotated in one direction by said motor and has cam surfaces assigned on a periphery thereof corresponding to a plurality of magnification steps;

a cam drive means for transmitting a rotary force from said motor to said cam;

an optical system which is movable between positions corresponding to said magnification steps; and a transmission means for transmitting a rotary force of said cam to said optical system to change said positions repeatedly in turn in the same order.

More particularly, the above mentioned object of the invention can be achieved by an optically variable magnification mechanism of electrophotographic copying apparatus for steppingly changing the magnification of copy comprising: a main motor that rotates in one direction; a polygonal cam having a plurality number of cam surfaces corresponding to the number of magnification steps; a cam drive means for rotating the cam in one direction by a rotational angle corresponding to the cam surface by connecting the main motor with the cam or disconnecting the main motor from the cam; a cam follower link that is disposed in contact with the cam surface and swings in response to the rotation of the cam; a lens drive means for shifting a lens having a fixed focal length forward and backward in response to the swinging motion of the link to move the lens to a position corresponding to the desired magnification; and a mirror drive means for changing an optical path length by shifting a mirror forward and backward in response to the swinging motion of the link to move the mirror to a position corresponding to the desired magnification.

In accordance with the above mentioned structure of the variable magnification system, the polygonal cam has equally divided cam surfaces corresponding to the number of magnification steps and is rotated in one direction step by step by a regular rotational angle corresponding to one cam surface by the driving force of the main motor so that the link is swung whereby the lens and the mirror are shifted to a predetermined position corresponding to the desired magnification. Therefore, it becomes possible to change the magnification by the main motor which is rotatable only in one direction.

Advantages of the above mentioned optically variable magnification mechanism in accordance with the present invention are that the structure becomes simplified and that the cost can be lowered.

Further objects and advantages of the present invention will be apparent from the following description of the preferred embodiments of the invention as illustrated in the accompanying drawings.

BRIEF DESCRIPTION OF THE DRAWINGS

FIG. 1 is a perspective view of the construction of the optically variable magnification mechanism in accordance with an embodiment of the present invention;

FIG. 2b is a sectional view of the cam of FIG. 2a;

FIG. 2c is a back side view of the cam of FIG. 2a;

DESCRIPTION OF THE PREFERRED EMBODIMENTS

Figure 2C:
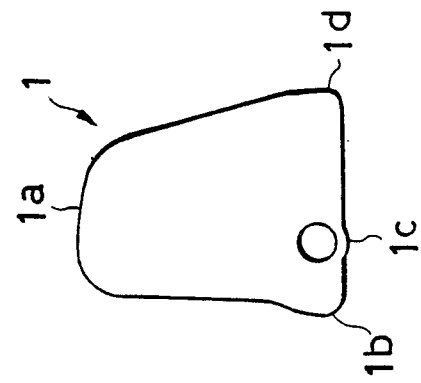

Embodiments of the present invention are described hereinafter in detail with reference to the drawings.

FIG. 1 illustrates an embodiment of the optically variable magnification mechanism in accordance with the present invention.

The electrophotographic copying apparatus in accordance with the embodiment is able to steppingly vary the magnification of the copy in four scales, i.e., full size scale, enlargement, first reduction and second reduction. The apparatus also comprises a not shown main motor which is rotatable in one direction and drives the conveyor system for conveying the photoconductor drum and the copying papers.

The apparatus is arranged in such a way that the magnification of the optical system can be changed with the use of the rotational drive force from the main motor. For this purpose the apparatus comprises a polygon cam 1 having an outer surface which is divided to four cam surfaces corresponding to the four magnification steps. The apparatus also comprises a cam drive means which is described later and drives the cam 1 to rotate in one direction by every predetermined angle corresponding to each of the four cam surfaces by connecting the main motor with the cam 1 or disconnecting the cam 1 from the motor. The apparatus further comprises a link gear 2 which is disposed in contact with the cam surface of the cam 1 and swings in response to the rotation of the cam 1. The link gear 2 is connected to a lens drive means 4 which shifts a lens 3 having a fixed focal length forward and backward in response to the swinging motion of the link gear 2 to position the lens 3 at a position corresponding to the desired magnification. The apparatus further comprises a mirror unit 7 which has a second mirror 5 and a third mirror 6 attached thereto. The mirror unit 7 is connected to a mirror drive means 8 for shifting the mirror unit 7 forward anf backward to position the unit 7 at a position corresponding to the desired magnification to change the length of the optical path in response to the swinging motion of the link gear 2.

Figure 2B:
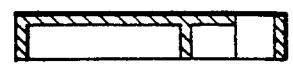
Figure 2A:
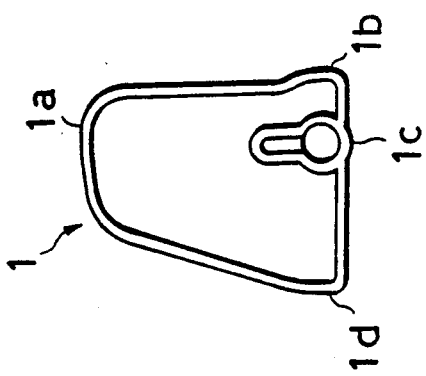
FIG. 2a is a front view of the cam according to the invention.

FIGS. 2a to 2c illustrate the polygon cam 1. Four cam surfaces 1a to 1d are assigned on the outer surface of the cam 1 corresponding to the four magnification scales, i.e., full size scale (surface 1d), enlargement (surface 1a), first reduction (surface 1b) and second reduction (surface 1c). The cam 1 is driven by a cam drive means which is mounted on a frame 9 to rotate about a rotary axle 10 by 90 degrees at a time in one direction as described later.

The link gear 2 has a teeth portion at one end thereof and comes in contact with the cam surface of the cam 1 at the other end thereof so that the gear swings about a pivot 11 in response to the rotation of the cam 1.

The lens 3 is mounted on a lens carriage 12 which is driven to move forward and backward to the position corresponding to the magnification of copy in response to the swinging motion of the link gear 2 by the lens drive means 4. The drive means 4 comprises a lower gear 13 which engages with the teeth of the link gear 2, a pinion gear 14 which is coaxial with the lower grear 13, a rack 16 which engages with the pinion gear 14 to move the carriage 12 forward and backward along a support bar 15, a lens guide 17 for guiding the lens 3 mounted on the carriage 12 along a guide groove 17a, and a spring 18 which urges the link gear 2 so that the end thereof comes in pressing contact with the cam 1.

The drive means 4 moves the carriage 12 on which the lens 3 is mounted forward and backward along the bar 15 in accordance with the swinging motion of the link gear 2 to the position corresponding to the magnification scale.

The mirror drive means 8 moves the mirror unit 7 to which the second and third mirrors 5 and 6 are attached forward and backward to change the length of the optical path by changing the position of the mirrors corresponding to the magnification scale. The drive means 8 comprises a lower gear 13 which engages with the teeth of the link gear 2, a magnification changing cam 19 which is coaxial with the lower gear 13, a cam follower 21 which is secured to the mirror unit 7 and arranged in contact with the cam 19 through a roller 20, a support bar 22 which supports and guides the mirror unit 7, and a spring 23 which urges the mirror unit 7 so that the roller 20 is pressed against the cam 19.

The drive means 8 moves the mirror unit 7 having the second and third mirrors 5 and 6 attached thereto forward and backward along the support bar 22 to the position corresponding to the magnification scale in accordance with the swinging motion of the link gear 2.

Figure 3:
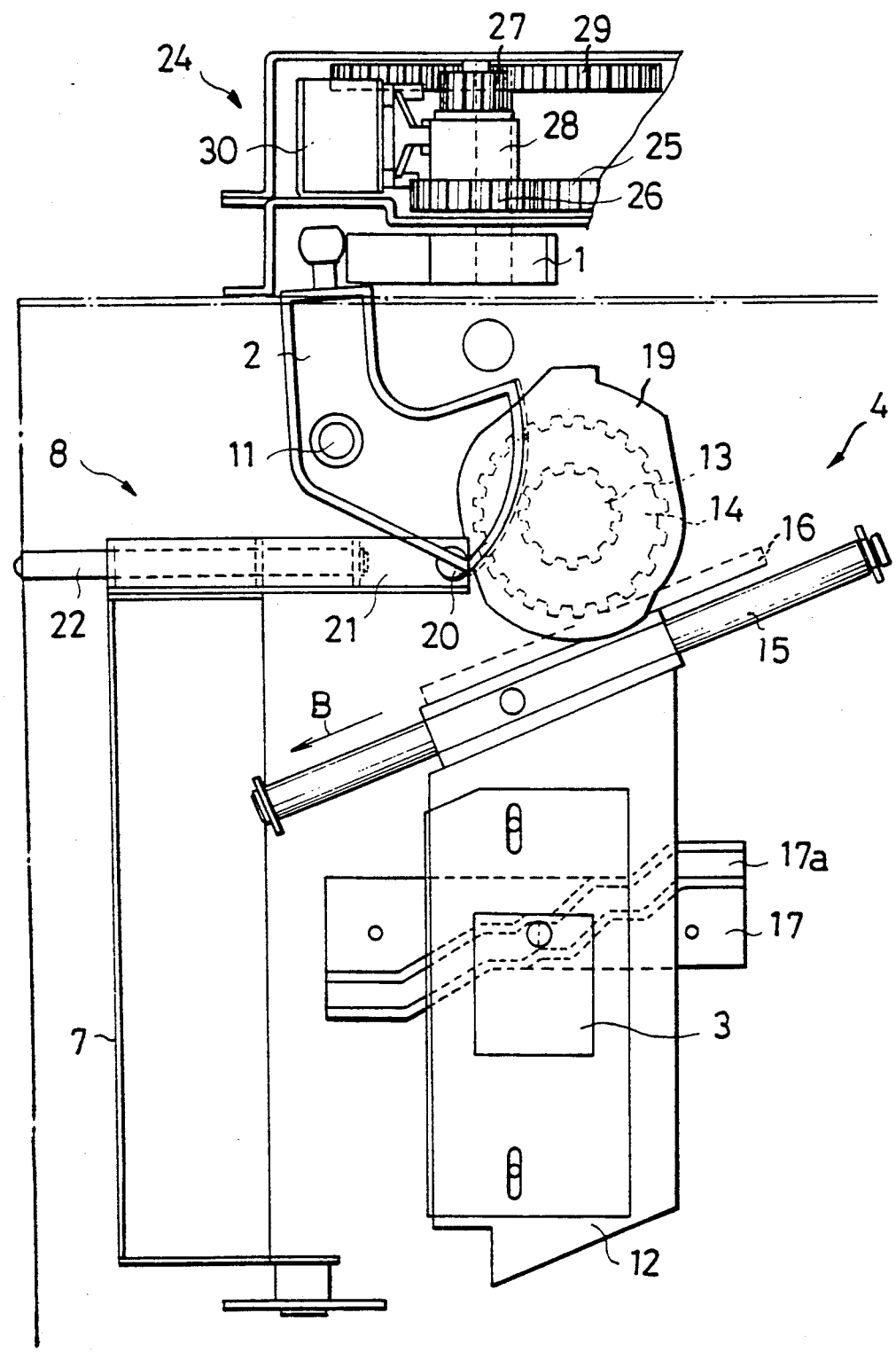
FIG. 3 is a plan view of the mechanism of FIG. 1 in a state of full size magnification.

FIG. 3 illustrates the variable magnification mechanism of FIG. 1 in a state of full size scale.

The cam 1 is rotated by a cam drive means 24 by every 90 degrees at a time in one direction by transmitting the rotational force of the main motor to cam 1 or disconnecting the main motor from the cam 1. The drive means 24 comprises a first gear 25 to which the rotational force of the not shown main motor is transmitted, a second gear 26 which engages with the first gear 25, a spring clutch 28 either for transmitting the rotation of the second gear 26 to a third gear 27 of 18T or disconnecting the second gear 26 from the third gear 27, a fourth gear 29 of 72T which is coaxial with the cam 1 and engages with the third gear 27, and a solenoid 30 for controlling the clutch 28.

In accordance with the above mentioned cam drive means 24, once the solenoid 30 is energized by a not shown drive circuit, a claw of the clutch 28 is moved to the solenoid side and released so that the rotational force of the second gear 26 is transmitted to the third gear 27. When the third gear 27 is rotated one turn, the claw of the clutch 28 is reconnected again so that the gears 26 and 27 are disconnected each other. When the third gear 27 is rotated one turn, the fourth gear 29 which has teeth four times as many as the third gear 27 is rotated by a quarter turn, whereby the cam 1 which is coaxial with the fourth gear 29 is rotated by a quarter turn, that is 90 degrees.

As mentioned above, each time when the solenoid 30 is energized, the cam 1 which has cam surfaces as illustrated in FIGS. 2a and 2c is rotated by every 90 degrees in one direction. Thereby, the magnification scale is repeatedly changed from full size scale to enlargement to first reduction to second reduction to full size scale again to enlargement to first reduction.

The function of the optically variable magnification mechanism having the above mentioned structure is described below.

For example, in the state of full size scale of FIG. 3, when the solenoid 30 is energized, the rotational force from the main motor is transmitted to the third gear 27 through the first and second gears 25 and 26 and the clutch 28 so that the third gear 27 is rotated by one turn, which makes the fourth gear 29 which engages with the third gear 27 rotated by a quarter turn, whereby the cam 1 is rotated by a quarter turn.

In accordance with the above mentioned motion of each of the parts, the link gear 2 is swung in the counterclockwise direction so that the lower gear 13 which engages with the gear 2 is rotated, accordingly. At the same time when the gear 13 is rotated, the coaxial pinion gear 14 is rotated. The rotation of the pinion gear 14 is transmitted to the rack 16 which in turn moves the carriage 12 on which the lens 3 is mounted along the support bar 15, as illustrated by an arrow B in FIG. 3, to a predetermined position of enlargement magnification which is illustrated in FIG. 4.

Also, in accordance with the swinging motion of the link gear 2, the cam 19 which is coaxial with the pinion gear 14 is also rotated in the counterclockwise direction to move the cam follower 21 through the roller 20. Thereby, the mirror unit 7 which is formed as one integrated unit with the cam follower 21 is shifted along the support bar 22 to a predetermined position of enlargement magnification illustrated in FIG. 4.

Figure 4:
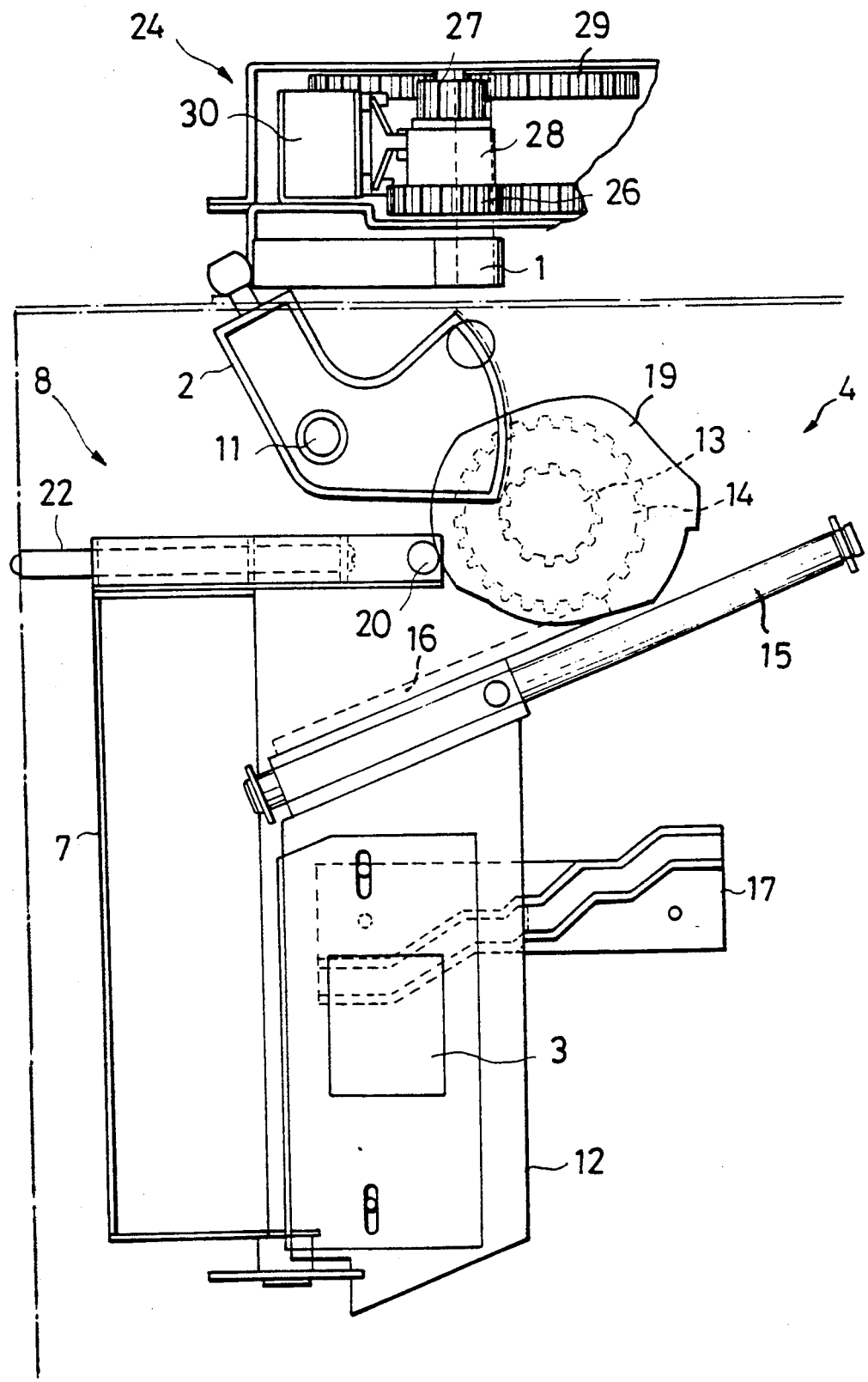
FIG. 4 is a plan view of the mechanism of FIG. 1 in a state of enlarged magnification.
Figure 5:
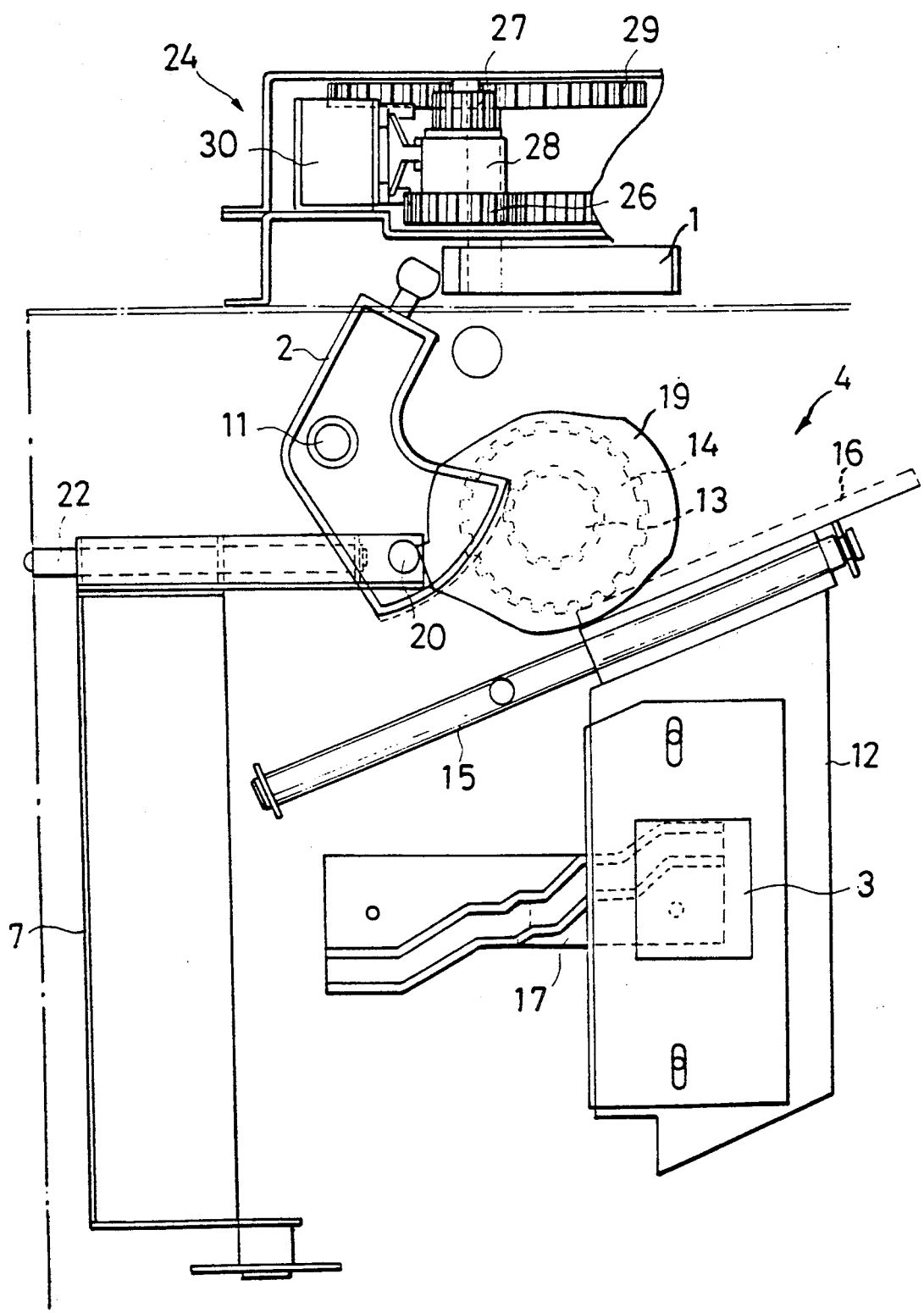
FIG. 5 is a plan view of the mechanism of FIG. 1 in a state of reduced magnification.

When the solenoid 30 is further energized in the state of enlargement magnification of FIG. 4, the mechanism functions in substantially the same manner as mentioned above so that the state is changed to the first reduction state illustrated in FIG. 5.

As mentioned above, in accordance with the present invention, with the use of the rotational force of the main motor which rotates only in one predetermined direction, the cam 1 is rotated by every 90 degrees at one time to repeatedly change the magnification step by step from full size scale to enlargement to first reduction scale to second reduction scale to full size scale again to enlargement to first reduction scale . . . , which makes it possible to simplify the structure of the copying apparatus and reduce the cost thereof in comparison to the structure in which a special drive motor for changing magnification is provided in addition to the main motor.

It is to be noted that the number of teeth of each gear and the magnification step number are not limited to those of the particular embodiment mentioned above in which the magnification changing cam is divided to four portions to change the magnification by four steps and the number of teeth of the fourth gear 29 is arranged to be four times as that of the third gear 27. Those numbers are determined depending on the number of the magnification steps.

Many widely different embodiments of the present invention may be constructed without departing from the spirit and scope of the present invention. It should be understood that the present invention is not limited to the specific embodiments described in the specification, except as defined in the appended claims.

What is claimed is:

1. An optically variable magnification mechanism adapted to be used for a copying machine comprising:
   a motor adapted to rotate only in one direction;
   a rotary cam having a plurality of surfaces assigned on a periphery thereof, said plurality of surfaces corresponding to a plurality of magnification steps, respectively;
   a cam drive means for driving said rotary cam to rotate only in one direction by predetermined angles corresponding to said plurality of surfaces of said rotary cam by using a rotational force generated by said motor, said cam drive means including a clutch capable of connecting and/or disconnecting said rotary cam with said motor for controlling a rotation of said rotary cam;
   an optical system adapted to be moved between positions coresponding to said plurality of magnification steps; and
   means for transmitting a rotary force of said rotary cam to said optical system so as to change said positions of said optical system sequentially.

2. A mechanism according to claim 1, wherein said optical system includes a lens having a fixed focal length, a carriage on which said lens is mounted and a mirror unit in which mirrors are disposed to form an optical path with said lens.

3. A mechanism according to claim 1, wherein said mechanism is installed in an electrophotographic copying apparatus.

4. An optically variable magnification mechanism adapted to be used for a copying machine comprising:
   a motor adapted to drive said copying machine;
   a rotary cam adapted to rotate in one direction, said rotary cam having cam surfaces assigned on a periphery thereof corresponding to a plurality of magnifications steps;
   a cam drive means for driving said rotary cam so that said rotary cam is enabled to rotate only in said one direction;
   an optical system including a mirror unit having a plurality of mirrors and a lens carriage having at least one lens mounted thereon, said lens carriage adapted to be moved between positions corresponding to said plurality of magnification steps;
   a link gear adapted to reciprocatedly swing about an axle in accordance with a rotary motion of said rotary cam;
   a lens drive means for driving said lens carriage so as to move said lens forward and backward in response to said swinging motion of said link gear; and
   a mirror drive means for driving said mirror unit so as to move said plurality of mirrors forward and backward in response to said swinging motion of said link gear.

* * * * *